(12) United States Patent
Su et al.

(10) Patent No.: US 9,768,858 B2
(45) Date of Patent: *Sep. 19, 2017

(54) SYSTEM AND METHOD FOR EFFICIENT RETRANSMISSION OVER A SATELLITE NETWORK

(71) Applicant: Hughes Network Systems, LLC, Germantown, MD (US)

(72) Inventors: Chi-Jiun Su, Rockville, MD (US); Lin-Nan Lee, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/845,921

(22) Filed: Sep. 4, 2015

(65) Prior Publication Data

US 2015/0381268 A1  Dec. 31, 2015

Related U.S. Application Data

(63) Continuation of application No. 13/328,588, filed on Dec. 16, 2011, now Pat. No. 9,130,750.

(51) Int. Cl.
*H04B 7/185* (2006.01)
*H04L 1/18* (2006.01)
*H04L 12/721* (2013.01)
*H04L 1/00* (2006.01)

(52) U.S. Cl.
CPC ....... *H04B 7/18528* (2013.01); *H04L 1/1867* (2013.01); *H04L 45/70* (2013.01); *H04L 1/0057* (2013.01); *H04L 2001/0093* (2013.01)

(58) Field of Classification Search
CPC .................................................. H04B 7/18582
USPC ............... 370/230, 252, 350, 395, 316, 437
See application file for complete search history.

(56) References Cited

U.S. PATENT DOCUMENTS

| | | | | |
|---|---|---|---|---|
| 2006/0087456 | A1* | 4/2006 | Luby | H03M 13/1191 341/50 |
| 2008/0212517 | A1* | 9/2008 | Thesling | H04B 7/18582 370/316 |
| 2010/0260254 | A1* | 10/2010 | Kimmich | H04N 21/631 375/240.01 |
| 2010/0290383 | A1* | 11/2010 | Wu | H04L 1/1607 370/312 |

* cited by examiner

*Primary Examiner* — Samina Choudhry
(74) *Attorney, Agent, or Firm* — K&L Gates LLP (57) ABSTRACT

A method for efficient retransmission over a satellite network including transmitting data packets to VSATs, receiving retransmission requests for at least one of the data packets from the VSATs, generating a retransmission packet based on the retransmission requests using XOR summing, transmitting the retransmission packet to the plurality of VSATs.

19 Claims, 4 Drawing Sheets

FIG. 1

|   | A | B | C | D | E |
|---|---|---|---|---|---|
| 1 | X |   |   | X |   |
| 2 |   |   |   |   | X |
| 3 |   | X |   |   |   |
| 4 | X |   |   |   |   |
| 5 |   |   | X |   |   |
| 6 | X |   |   | X |   |
| 7 |   | X |   |   | X |
| 8 |   |   | X |   |   |
| 9 |   |   | X | X |   |
| 10 | X |   |   |   |   |
| 11 |   | X |   |   |   |
| 12 |   |   | X |   |   |
| 13 | X |   |   | X |   |
| 14 |   | X |   |   |   |
| 15 |   |   | X |   |   |

|   | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| A | X | X | X | X |   |   |   |   |   |    |    |    |    |    |    |
| B |   |   |   | X | X | X | X |   |   |    |    |    |    |    |    |
| C |   |   |   |   |   | X | X | X | X |    |    |    |    |    |    |
| D |   |   |   |   |   |   |   |   | X | X  | X  | X  |    |    |    |
| E |   |   |   |   |   |   |   |   |   |    |    | X  | X  | X  | X  |

FIG. 4

SYSTEM AND METHOD FOR EFFICIENT RETRANSMISSION OVER A SATELLITE NETWORK

BACKGROUND

In large broadcast networks, data to be broadcast, such as a large file, may be sent with a strong Forward Error Correction (FEC) code such as a Reed-Solomon (RS) code, which can be used to correct transmission errors and missing data. If the number of errors and erasures in the broadcast data exceeds the error correcting capability of the FEC code, repetitive transmission may be used. For a large number of receiving terminals, or Very Small Aperture Terminals (VSATs), in a satellite network, it may possible that some VSATs have more errors and erasures in their receipt of the broadcast data than can be corrected using the FEC code. VSATs may also miss portions of the broadcast data due to, for example, power failures. The broadcast data may be repeated several times.

A variation of this scheme, called a carousel, may be used for video broadcast, which may send a program periodically over and over again. For such applications, Fountain codes, also known as Raptor codes or Tornado codes, may be used. Redundancy in the broadcast data may be generated as linear combination of data bytes. Data transmitted over the air includes a linear combination of the data. Fountain codes cannot be better at error correction than the Reed-Solomon codes, which are theoretically optimal. Fountain codes may have a less rigid structure and may be simpler to implement than Reed-Solomon codes.

Reed-Solomon code or Fountain code based systems may be meant to work in a one-way broadcast network where the receivers do not have a way to request retransmission of data. With a return link, terminals, such as VSATs, can correct erroneously received packets in received data, such as a large file, by requesting retransmission on a packet by packet basis. Targeted retransmission may be more efficient than blindly sending the entirety of the data several times. Once the first transmission is completed, channels may be used for retransmission only when a VSAT requests retransmission. The Automatic Repeat Request (ARQ) is a well-known technique which works very well for communications between one transmitter and one receiver. In a single transmitter/multiple receiver case, however, the number of retransmissions increases as the size of receiver population, as the errors at different receivers are different. For a broadcast network with hundreds or thousands of receiving terminals, the number of retransmissions increases by two or three orders of magnitudes respectively.

BRIEF SUMMARY

It is an object of the present invention to provide a system and method for efficient retransmission over a satellite network In accordance with an aspect of the present invention, a method for efficient retransmission over a satellite network includes transmitting data packets to VSATs, receiving retransmission requests for at least one of the data packets from the VSATs, generating a retransmission packet based on the retransmission requests using XOR summing, transmitting the retransmission packet to the plurality of VSATs.

Additional objects, advantages and novel features of the invention are set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION

Figure 1:
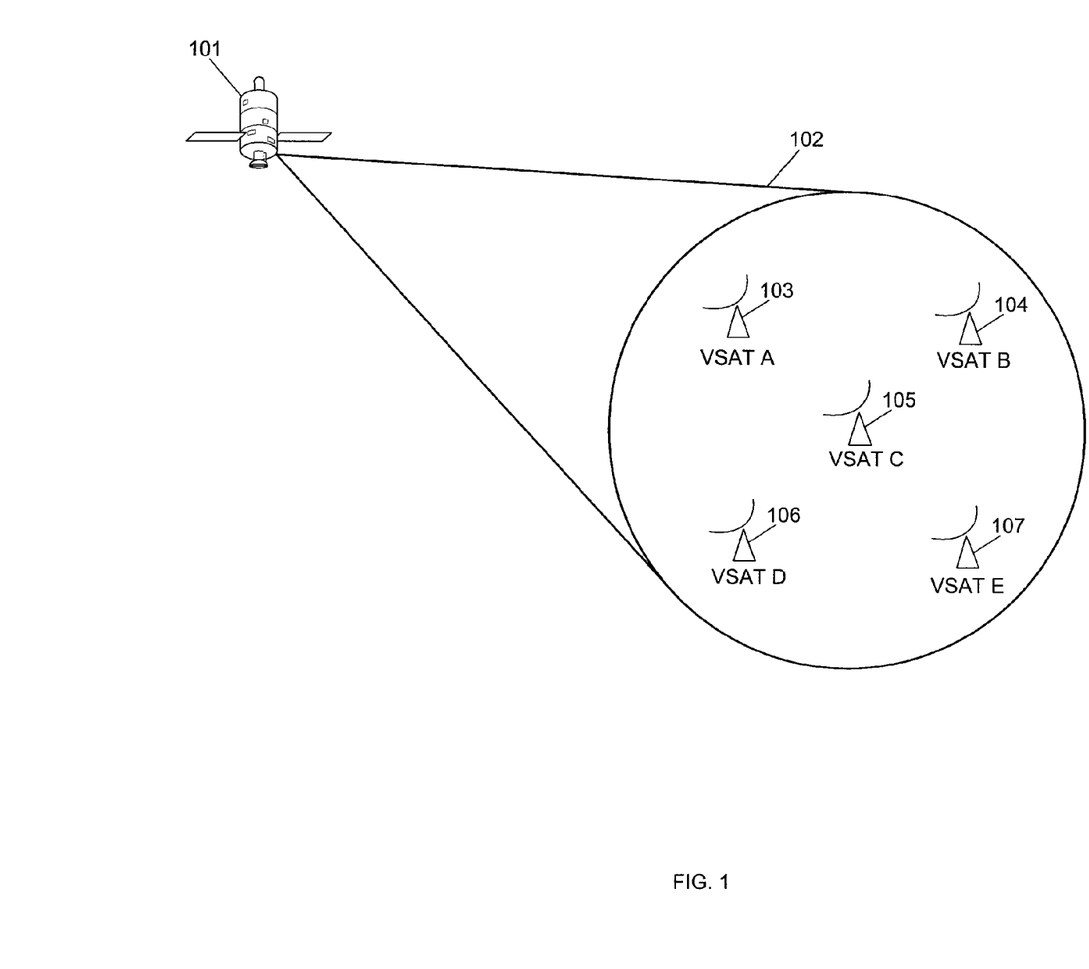
FIG. 1 depicts an exemplary satellite communications system.

FIG. 1 depicts an exemplary satellite communications system. The satellite communications systems may include a satellite 101, a user spot beam coverage area 102, Very Small Aperture Terminal (VSAT) A 103, VSAT B 104, VSAT C 105, VSAT D 106, and VSAT E 107.

The satellite 101 may be any suitable communications satellite for connecting a satellite ground station, or hub or gateway, to VSATs within a user spot beam coverage area 102. The user spot beam coverage area 102 may be the geographical area within which VSATs can receive service from the satellite 101. The satellite 101 may use small spot beams to optimize capacity and availability for user terminal and gateway access, with uplink and downlink frequencies reused between spot beams in a pattern to maximize capacity and coverage while minimizing co-frequency interference. Gateway coverage may be provided by gateway spot beams. The gateway spot beam may be connected through the satellite 101 to the user spot beams that create the user spot beam coverage area 102, connecting the VSATs to the gateway. User spot beams may be adjacent, overlapping, or dispersed through the user terminal coverage area.

The satellite 101 may use spot beam and frequency and polarization reuse to maximize the total capacity of the system. Signals passing through the satellite 101 in the forward direction, towards the VSATs, may be based on the DVB S.2 standard (ETSI EN 302 307) using signal constellations up to and including 32-APSK. The signals intended to pass through the satellite 101 in the return direction, toward the hubs, may be based on the IPoS standard (ETSI TS 102 354). Other suitable signal types may also be used in either direction, including, for example DVB-RCS, DVB-RCS2, or proprietary formats. The satellite 101 may also be bypassed in the return direction in favor of a terrestrial return link from the VSATs to the gateway.

The VSATs may be used by end users to access the satellite communications system. A VSAT may include a remote satellite dish for receiving RF signals from and transmitting RF signals to the satellite 101, a satellite modem and other equipment for managing the sending and receiving of data, and one or more remote hosts, which may be computer systems or other electronic devices capable of network communications at a site remote from the gateway. For example, a VSAT may be used at a residence or place of business to provide access to the Internet, or to provide television service. The gateway, satellite ground station, or hub may be connected to the Internet or other ground based telecommunications infrastructure. The VSATs within the spot beam coverage area 102 may access the Internet or ground based telecommunications infrastructure through the connections between the satellite 101 and the gateway. For example, the VSAT A 103, VSAT B 104, VSAT C 105, VSAT D 106 and VSAT E 107 may access the Internet through the satellite 101.

The satellite communications system may also include, for example, gateway terrestrial network connectivity to a PSTN, private networks or other networks, along with connectivity to the Internet, service and network management systems, user equipment, interconnect infrastructure, and other infrastructure and components suitable for a satellite communications system.

The satellite 101 may be used to distribute a large file to a number of VSATs within the user spot beam coverage area 102 at the same time. For example, the satellite 101 may be used for digital distribution of cinema quality motion pictures from content providers to a chain of movie theaters spread over the user spot beam coverage area 102. A large chain may have hundreds, or even thousands of theaters. Each theatre may have a VSAT and digital storage ready to receive a broadcast of a movie file from the satellite 101. The satellite 101 may also be used to distribute files for software updates, or data base dumps within an enterprise.

Transmission of data between the satellite 101 and the VSATs in the user spot beam coverage area 102 may be reliable and efficient when the sky is clear, through the use of modern modulation and forward error correction (FEC) coding schemes such as, for example, those specified by Digital Video Broadcast via Satellite 2nd generation (DVB/S2). Reception errors at the VSATs may occur only when the receiving VSAT experiences severe rain fade, due to rain in that VSATs part of the user spot beam coverage area 102. Rain fades may typically be localized, causing the VSATs receiving the same file, for example, the movie file, to have errors in different portions of the file. If the file was distributed to a large number of VSATs, many parts of the large file may require retransmission.

The transmission of data from the satellite 101 to the VSATs in the user spot beam coverage area 102 may be broadcast in nature, allowing a single transmission to be received by all the VSATS in the user spot beam coverage area when the sky is clear. The VSATs may be capable of two way communication, allowing the VSATs to request retransmission of packets when the VSATs detect errors in their reception of data. The return link from the VSATs may be either via terrestrial links such as digital subscriber loop (DSL) or cable, or via a satellite link.

Most of the packets for a file transmitted to the VSATs by the satellite 101 may be correctly received by each VSAT during the transmission of the file. When a specific packet is requested by a VSAT for retransmission, both the VSAT and the specific packet may be uniquely identified in the request. Requests from multiple VSATs may be arranged in a table, and an algorithm may be used to minimize the number of packets that are retransmitted.

When several VSATs request retransmission of several different packets, the packets requested by more than one VSAT may be summed in binary form using Exclusive OR, or XOR, and the sum with the identities of all the packets included in the sum as part of the header, may be sent to the VSATs by the satellite 101. As long as no more than one packet out of a group of summed packets has been requested by the same VSAT, all of the VSATs requesting the packets may be able to recover their respectively requested packets by subtracting using XOR correctly received packets from the received sum. This may reduce the number retransmissions by a factor equal to the number of packets summed together.

Figure 2:
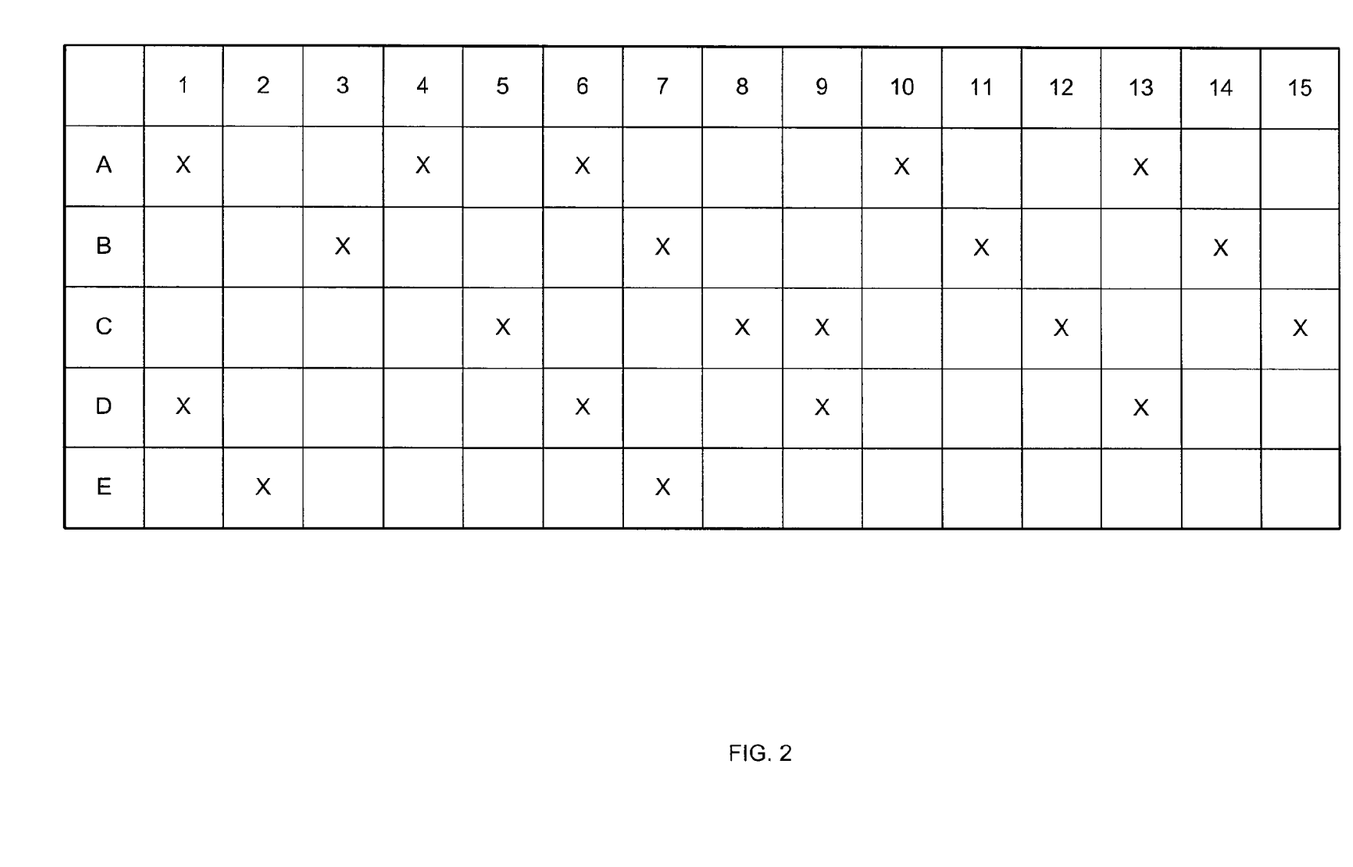
FIG. 2 depicts an exemplary table of packets to be retransmitted based on requests.

FIG. 2 depicts an exemplary table of packets to be retransmitted based on requests. The satellite 101 may transmit a segment of a file including 15 equal-sized packets, 1 through 15, to the VSATs in the user spot beam coverage area 102. As shown in FIG. 2, the VSAT A 103, the VSAT B 104, the VSAT C 105, the VSAT D 106, and the VSAT E 107 may request retransmission of particular packets from the segment of the file. For example, as shown in FIG. 2, the VSAT A 103 may request retransmission of packets 1, 4, 6, 10 and 13. The simplest approach may be to retransmit all 15 packets from the satellite 101 to the VSATs in the user spot beam coverage area 102, so that each of the VSATs may receive their requested packets. This may be inefficient. Instead of retransmitting all 15 packets, the satellite 101 may send a retransmission packet that is the XOR sum of packets 1, 2, 3 and 5 to the VSATs, along with a header indicating the packets that were summed. This may be followed by a packet each for the XOR sums of packets 4, 7, and 8, packets 6, 11, and 12, packets 9, 10, and 14, and packets 13 and 15.

When the VSAT A 130 receives the retransmission packet that is the XOR sum of packets 1, 2, 3 and 5, the VSAT A 103 may subtract out using XOR the packets the VSAT A 103 has already received correctly, packets 2, 3, and 5, allowing the VSAT A 103 to retrieve packet 1 from the XOR sum packet. The VSAT A 103 may retrieve packet 4 similarly, subtracting packets 7 and 8 using XOR from the XOR sum packet for packets 4, 7, and 8. Packet 4 may not be included in the first XOR sum packet, because doing so may prevent the VSAT A 103 from retrieving either packet 1 or packet 4. For example, if packet 4 were in the first XOR sum along with packets 1, 2, 3, and 5, then when the VSAT A 103 subtracted out using XOR the successfully received packets 2, 3, and 5, the VSAT A 103 would be left with the XOR sum of packet 1 and packet 4. Since the VSAT A 103 did not correctly receive either packet 1 or packet 4 initially, the VSAT A 103 would not be able to subtract using XOR anything from the XOR sum of packet 1 and packet 4 to retrieve either packet 1 or packet 4.

For example, packet 1 may be, in binary, 01101101. Packet 2 may be 01100111, packet 3 may be 10111011, and packet 5 may be 00111001. XOR summing packets 1, 2, 3, and 5 may result in a retransmission packet value of:
01101101 (packet 1)
XOR
01100111 (packet 2)
00001010
XOR
10111011 (packet 3)
10110001
XOR
00111001 (packet 5)
10001000 (retransmission packet)

Upon receiving the retransmission packet, the VSAT A 103 may subtract using XOR packets 2, 3, and 5, which the VSAT A 103 has already received correctly, from the retransmission packet to retrieve packet 1:
10001000 (retransmission packet)
XOR
01100111 (packet 2)
11101111
XOR
10111011 (packet 3)
01010100
XOR 00111001 (packet 5)
01101101 (packet 1).

Similar subtraction using XOR may be performed for all of the requested packets shown in FIG. 2 by the VSAT A 103, the VSAT B 104, the VSAT C 105, the VSAT D 106, and the VSAT E 107. This may allow each of the VSATs to retrieve their respective requested packets without requiring the retransmission of all 15 packets. The packet error rate as depicted in FIG. 2 may be is 4/15 or 27% on the average for each VSAT, but only 5 packet retransmissions may needed, instead of 15 retransmissions, achieving a factor of 3 reduction in packet retransmission. For larger networks with more VSATs, the number of packets that can be summed together may be larger, and this may lead to a greater factor of reduction.

Figure 3:
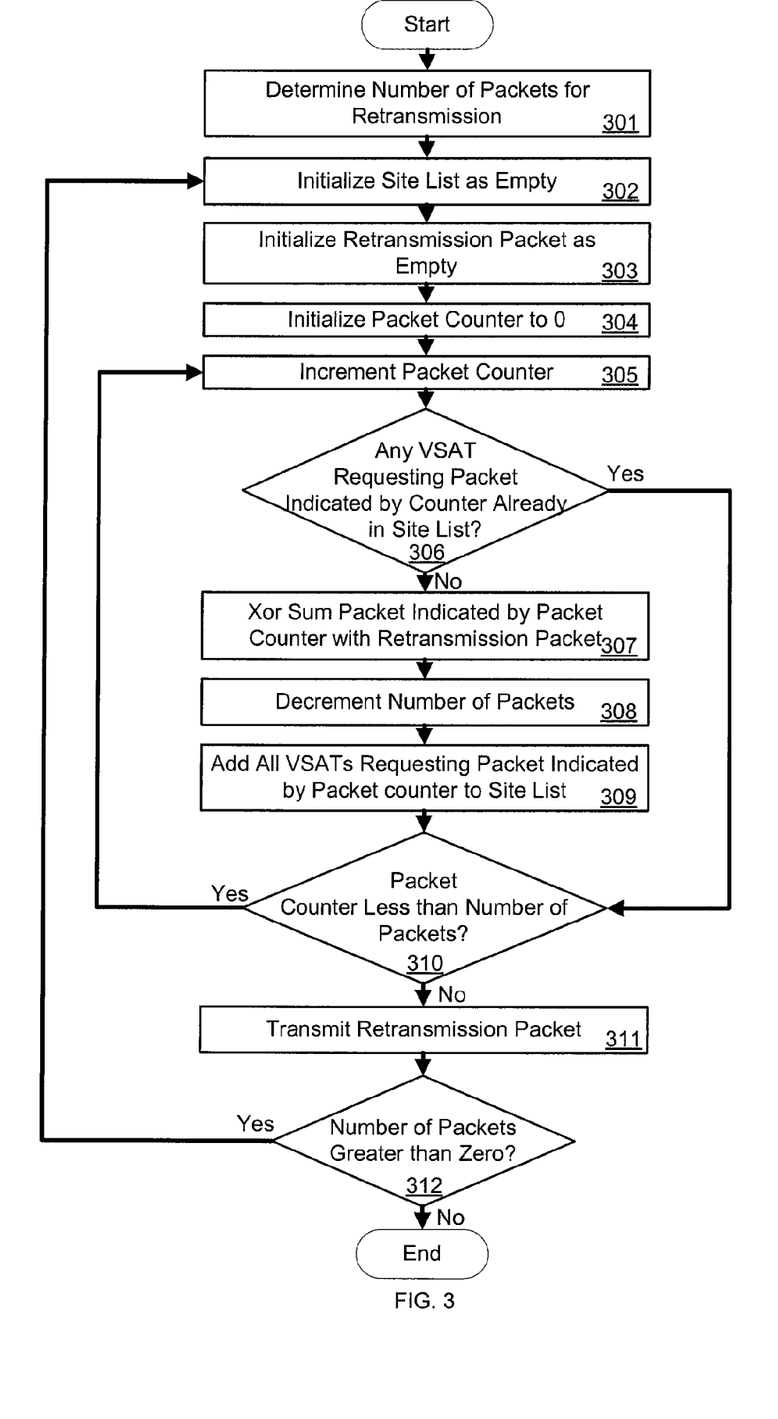
FIG. 3 depicts an exemplary procedure for efficient retransmission of requested packets.

An algorithm may be used to determine which packets to XOR sum together and retransmit to the VSATs in order to fulfill retransmission requests with the fewest number of transmitted packets. The algorithm may be performed by any suitable combination of computing hardware and software, and may be performed, for example, onboard the satellite 101, or at the gateway. The number of retransmission packets may be equal to or greater than the maximum number of packet retransmission requests from one of the VSATs, because no more than one packet requested by a VSAT may be XOR summed into the same retransmission packet. For example, in FIG. 2, the VSAT A 103 and the VSAT C 105 may each have requested retransmission of 5 packets, more than any of the other VSATs. The number of retransmission packets needed may be five or more. FIG. 3 depicts an exemplary procedure for efficient retransmission of requested packets. In block 301, the number of packets, NoOfPackets, requested for retransmission may be determined. A table may be constructed with the retransmission requests to determine the number of unique requested packets for retransmission. For example, as in FIG. 2, 15 unique packets have been requested for retransmission, NoOfPackets=15.

In block 302, a site list may be initialized as empty. The site list, SiteList, may be used to keep track of which VSATs have requested retransmission of a particular packet. The site list may start off empty for each retransmission packet, SiteList={ }.

In block 303, a retransmission packet may be initialized as empty. The retransmission packet, X, may be the packet which will include the XOR sum of several packets for which retransmission has been requested, and which will be sent to the VSATs to allow the VSATs to retrieve their requested packet. The retransmission packet may start off empty for each retransmission packet, X=0.

In block 304, a packet counter may be initialized to zero. The packet counter, i, may be use to track which packet is currently being evaluated to be XOR summed into the retransmission packet. The packet counter may start at zero for each retransmission packet, i=0.

In block 305, the packet counter may be incremented, i=i+1. For example, if the packet counter is at 0, the packet counter may be incremented to 1, indicating that packet 1 will be considered for inclusion in the retransmission packet.

In block 306, whether any VSAT requesting the packet indicated by the packet counter is already in the site list may be determined. If there are VSATs requesting the indicated packet, and none of the requesting VSATs is in the site list, flow proceeds to block 307. Otherwise, if there are no VSATs requesting the indicated packet, for example, because the packet has already been added to a retransmission packet based on requests from the VSATs, or there are requesting VSATs but they are already in the site list, flow proceeds to block 310. For example, the packet counter may indicate packet 1 is being considered for inclusion in the retransmission packet. The site list may be checked to determine if any VSAT that has requested packet 1, for example, as indicated on the table constructed from the retransmission requests, is already included in the site list. As shown in FIG. 2, packet 1 may be requested by the VSAT A 103 and the VSAT D 106. If neither the VSAT A 103 nor the VSAT D 106 are in the site list, (A and D) $\notin$ SiteList, then flow would proceed to block 307. Otherwise, if either the VSAT A 103 or the VSAT D 106 are already in the site list, (A or D) $\in$ SiteList, flow would proceeds to block 310.

In block 307, the packet indicated by the packet counter may be XOR summed with the retransmission packet. For example, if the packet counter indicates packet 1, i=1, packet 1 may be XOR summed with the retransmission packet. Because packet 1 may be the first packet considered, and the retransmission packet may still be zero, the XOR sum of packet 1 and the retransmission packet may equal packet 1. Subsequently, the packet 2 may be XOR summed with the retransmission packet, as packet 2 may not be requested by any of the VSATs that requested packet 1, and therefore won't be in the site list in block 306 when i=1, resulting in the retransmission packet being equal to the XOR sum of packet 1 and packet 2. The header of the retransmission packet may also be updated to include an identifier for the XOR summed packet. For example, the header of the retransmission packet may be updated to indicate that packet 1 was XOR summed into the retransmission packet.

In block 308, the number of packets may be decremented, NoOfPackets=NoOfPackets−1. For example, after XOR summing packet 1 into the retransmission packet, the number of packets may be decremented from 15 to 14.

In block 309, all VSATs that requested the packet indicated by the packet counter may be added to the site list. For example, if the packet counter indicates packet 1, and packet 1 was XOR summed into the retransmission packet, the VSATs that requested retransmission of packet 1, the VSAT A 103 and the VSAT D 106, may be added to the site list, SiteList={A, D}U SiteList. This may prevent any other packets requested for retransmission by the VSATs that requested the indicated packet from being XOR summed into the retransmission packet, as no retransmission packet may include an XOR sum of more than one packet requested by an individual VSAT. For example, the packet 4 may not be XOR summed into the retransmission packet that already includes packet 1, due to the VSAT A 103 requesting both packet 1 and packet 4. The table of retransmission requests for the VSATs may also be updated to remove the retransmission requests from the VSATs added to the site list for the packet indicated by the packet counter. For example, the retransmission requests for packet 1 made by the VSAT A 103 and the VSAT D 106 may be removed from the table of retransmission requests. This may prevent the sending out of multiple identical retransmission packets.

In block 310, whether the packet counter is less than the number of packets may be determined. If the packet counter is less than the number of packets, i<NoOfPackets, flow proceeds back to block 305, where the packet counter may be incremented and the next packet may be considered for XOR summing into the retransmission packet. Otherwise, flow proceeds to block 311.

In block 311, the retransmission packet may be transmitted. For example, the retransmission packet, which may include the XOR sum of several requested packets, along with a header identifying the requested packets XOR summed into the retransmission packet, may be transmitted by the satellite 101 to the VSATs in the user spot beam coverage area 102. The VSATs may receive the retransmission packet and check the header to determine if one of their requested packets was XOR summed into the retransmission packet. If a VSAT determines that the retransmission packet does not include any of the VSATs requested packets, the VSAT may discard the retransmission packet. Otherwise, the VSAT may retrieve the requested packet from the retransmission packet, as described previously.

In block 312, whether the number of packets is greater than zero may be determined. If the number of packets is greater than zero, NoOfPackets>0, then flow proceeds back to block 302, where the site list, packet counter, and retransmission packet may be reinitialized so that a new retransmission packet may be constructed. Otherwise, flow ends, as all of the packets requested for retransmission were retransmitted as part of one of the retransmission packets.

Figure 4:
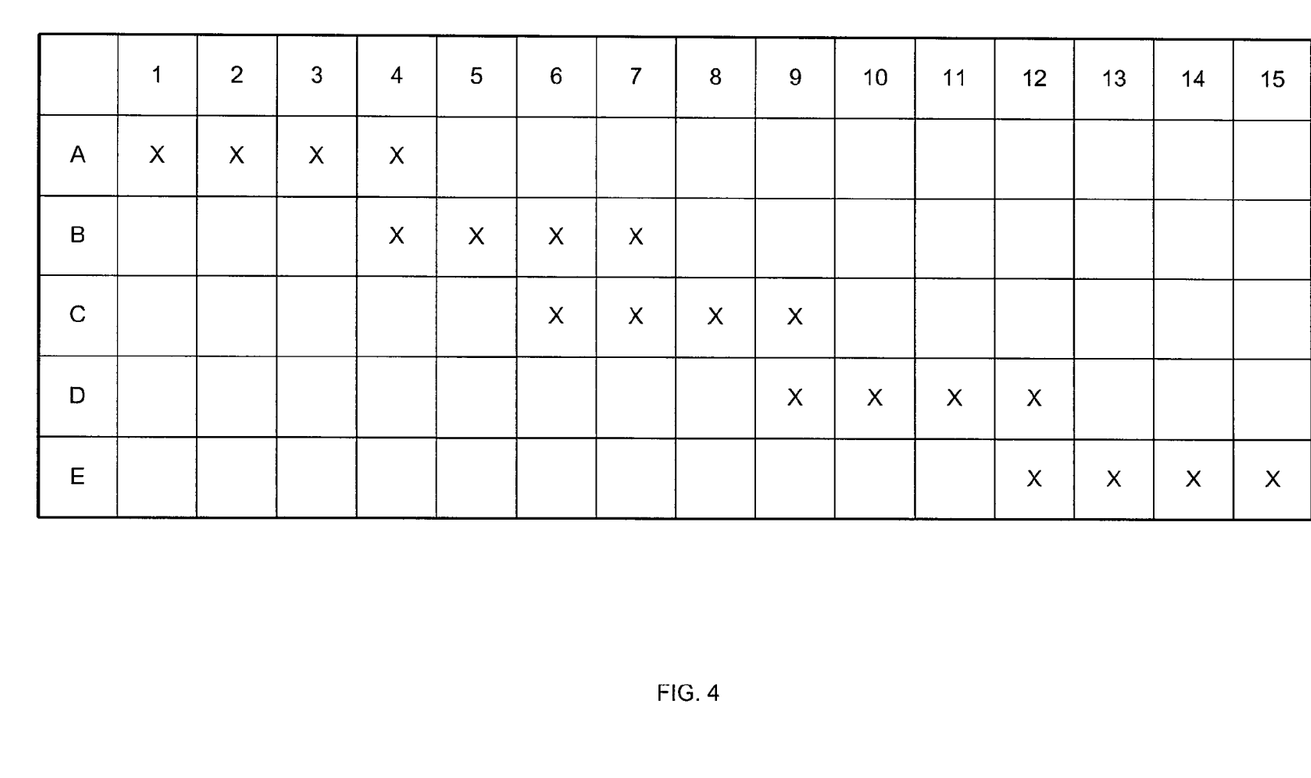
FIG. 4 depicts an exemplary table for segments of a file to be retransmitted based on requests due to rain fade moving across a coverage area.

Requests for retransmission of segments of a file by a large number of VSATs may be made when a rain storm moves across a coverage area, such as the user spot beam coverage area 102. FIG. 4 depicts an exemplary table for segments of a file to be retransmitted based on requests due to rain fade moving across a coverage area. For example, a severe rain storm may move across the user spot beam coverage area in a northeasterly direction over 75 minutes, while the satellite 101 is sending a large file, such as, for example, a movie file, to a number of VSATs in the user spot beam coverage area 102.

The VSATs in the path of the storm may lose their data connection to the satellite 101 for about 20 minutes in a staggered manner. All parts of the file being sent by the satellite 101 covering the 75-min period may need to be resent even though each location only experiences 20 minutes of severe rain fade. Once the storm has passed, the VSATs may be able to receive data from the satellite 101 without error.

As depicted in FIG. 4, each segment of the table may represent a five minute duration within the 75 minutes. For example, the storm may have caused rain fade at the VSAT A 103 that lasted for 20 minutes, during which the VSAT A 103 did not correctly receive 5 minute segments 1 through 4 of the file. The VSAT B 104 may not have correctly received segments 4 though 7, the VSAT C 105 may not have correctly received segments 6 through 9, the VSAT D 106 may not have correctly received segments 9 though 12, and the VSAT E may not have correctly received segments 12 through 15. The procedure, as described in FIG. 3, may be used to create an efficient retransmission scheme for the VSATs. The packets for file segments 1, 5, 8, 10 and 13 may be XOR summed, creating enough retransmission packets for a first five minute retransmission segment. Segments 2, 6, 11, and 14, may be XOR summed for a second five minute retransmission segment, segments 3, 7, and 12 may be XOR summed for a third five minute retransmission segment, and segments 4, 9, and 15 may be summed for a fourth 5 minute retransmission segment. This may allow all of packets from the requested segments to be retransmitted in a total of 20 minutes, instead of 75 minutes, achieving a reduction in time factor of 3.75. The VSATs may subtract using XOR packets from correctly received segments from the retransmission segments to retrieve requested segments. For example, when the VSAT A 103 receives the first five retransmission minute segment, the VSAT A 103 may subtract out using XOR the packets from segments 5, 8, 10, and 13 to retrieve the packets from segment 1. The retransmission may be done after the storm has passed through the user spot beam coverage area 102, and may be error free. The amount of data retransmitted may be equal to the amount of data needed to retransmit for the worst single location in the user spot beam coverage area 102 area, even with multiple occurrences during the period of transmission.

Modern VSATS may be capable of reporting a carrier-to-noise-plus-interference ratio, C/(N+I). This capability may be used by the VSAT to select a coding/modulation (modcod) mode for point-to-point transmission. For the transmission of large files, a single modcod that allows most of, if not all, if the VSATs to successfully receive the file may be used to minimize the number of retransmission requests. The C/(N+I) reporting may be useful for selecting this single modcod. A modcod that allows the VSAT with the lowest C/(N+I) to receive the file reliably may be selected. If a small number of VSATs require an unacceptable reduction of the transmission speed, thereby lengthening the transmission time, those VSATs may be left out of the transmission and may receive the file via alternative means of delivery, such as physical transportation of the media.

In addition to selecting a modcod for the initial transmission, the C/(N+I) reporting may also be included in the request for retransmission. Since retransmission may be targeted to the VSATs that requested retransmission, and since only a small number of packets may be included in the XOR sum retransmission packets, it may be possible to select the modcod that supports the lowest C/(N+I) among the VSATs sharing the retransmission to increase the chance of success for the retransmission. A higher layer prioritization may also be possible, by sending the retransmission to a group of VSATs with an acceptable C/(N+I), and delaying the retransmission for groups of VSATs with very low C/(N+I) until those VSATs report a more acceptable C/(N+I), instead of forcing the retransmission through deep rain fades.

A modcod for a particular retransmission packet must support all of the VSATs sharing the retransmission. The broadcast and retransmission described may use multi-cast traffic, as the transmitted file may be intended for receipt by multiple VSATs within the user spot beam coverage area 102. This may not preclude sharing the satellite channel with single-cast traffic. For example, the file broadcast may be used for caching purposes in the background while VSAT specific applications are running in the foreground. The single cast messages may use an optimized modcod for the particular link, whereas the broadcast may use a less efficient but stronger modcod to ensure the majority of the VSATs receive the broadcast reliably. A third modcod may be used for the retransmission packets, which may be targeted to those VSATs that need to receive the retransmission.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wire line varieties thereof, and/or any other computerized device capable of configuration for receiving, storing and/or processing data for standalone application and/or over a networked medium or media. Examples of communication media that can be employed include, without limitation, wireless data networks, wire line networks, and/or a variety of networked media.

Computers and computer systems described herein may include operatively associated computer-readable media such as memory for storing software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable media may include any medium capable of being a carrier for an electronic signal representative of data stored, communicated or processed in accordance with embodiments of the present invention. Where applicable, method steps described herein may be embodied or executed as instructions stored on a computer-readable medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A system for efficient retransmission over a satellite network comprising:
   a satellite; and
   a plurality of very small aperture terminals (VSATs),
   wherein the satellite is configured to transmit data packets to the plurality of VSATs, receive at least one retransmission request for data packets from the plurality of VSATs, and transmit a plurality of retransmission packets, which are generated based on exclusive OR (XOR) sums of the requested plurality of retransmission packets including an XOR sum of respective groups of requested data packets including at least a first requested data packet and a second requested data packet, to the plurality of VSATs, and each respective group of requested data packets includes at most one data packet requested by each VSAT in the plurality of VSATs, such that the first requested data packet and the second requested data packet are requested by different VSATs,
   wherein generating a first retransmission packet includes:
      determining the first requested data packet is requested for retransmission by a first VSAT,
      determining whether a third requested data packet that is requested by the first VSAT has been XOR summed into the first retransmission packet, and
      if the third requested data packet that was requested by the first VSAT has not been XOR summed into the first retransmission packet, XOR summing the first requested data packet into the retransmission packet and modifying a header of the first retransmission packet to identify the first requested data packet, and
      if the third requested data packet that was requested by the first VSAT has been XOR summed into the retransmission packet, not XOR summing the first requested data packet into the retransmission packet and maintaining the header of the first retransmission packet to not identify the first requested data packet, and
   wherein the plurality of VSATs are configured to receive the data packets from the satellite, transmit the at least one retransmission request for data packets to the satellite, receive the plurality of retransmission packets, and recover the requested plurality of retransmission packets based on subtraction using XOR of at least one of the received data packets from at least one of the respective groups of requested data packets that includes at most one data packet requested by each VSAT in the plurality of VSATs.

2. The system of claim 1, wherein the requested data packets were not correctly received by at least one of the plurality of VSATs.

3. The system of claim 1, wherein a first coding/modulation (modcod) is applied to the data packets and a second modcod is applied to the retransmission packets.

4. The system of claim 1, wherein the plurality of VSATs are located in a user spot beam coverage area of the satellite.

5. The system of claim 1, wherein one of the retransmission packets does not comprise the XOR sum of more than one requested data packet from one of the plurality of VSATs.

6. The system of claim 1, wherein the retransmission packets are retransmitted using a coding/modulation (modcod) selected for the plurality of VSATs requesting retransmission that have a carrier-to-noise-plus interference ratio higher than a threshold, and wherein the plurality of VSATs requesting retransmission that have a carrier-to-noise-plus-interference ratio below the threshold wait to receive retransmission until the carrier-to-noise-plus-interference ratio improves to be above the threshold.

7. The system of claim 1, further comprising a gateway.

8. The system of claim 7, wherein the gateway receives the at least one retransmission request for data packets transmitted from the plurality of VSATs and transmitted through the satellite, and the gateway generates the plurality of retransmission packets.

9. The system of claim 1, wherein the data packets requested for retransmission are correlated to the plurality of VSATs that requested the retransmission of the data packets.

10. The system of claim 1, wherein generating a second retransmission packet based on the at least one retransmission request for data packets includes:
- determining a number of unique data packets requested for retransmission until the number of unique data packets requested for retransmission is decremented to zero,
- generating an empty site list;
- generating an empty retransmission packet;
- setting a packet counter to one; and
- until the packet counter is less than the number of unique data packets requested for retransmission,
  - determining if a VSAT requesting a data packet indicated by the packet counter is in the site list;
  - if the VSAT requesting the data packet is in the site list, incrementing the packet counter, and
  - if the VSAT requesting the data packet is not in the site list,
    - XOR summing the data packet with a retransmission packet;
    - adding an identity of the data packet to the header of the retransmission packet;
    - decrementing the number of unique data packets requested for retransmission;
    - adding all of the plurality of VSATs requesting the data packet to the site list based on a table; and
    - removing entries from the table that correlate the data packet to the plurality of VSATs requesting the data packet; and
    - incrementing the packet counter.

11. An apparatus for efficient retransmission over a satellite network comprising:
- a satellite comprising:
- a processor; and
- a memory storing instructions configured to be executed by the processor to:
- transmit data packets to a plurality of very small aperture terminals (VSATs);
- receive at least one retransmission request for packets from the plurality of VSATs; and
- transmit a plurality of retransmission packets, which are generated based on exclusive OR (XOR) sums of the requested plurality of retransmission packets including an XOR sum of respective groups of requested data packets including at least a first requested data packet and a second requested data packet, to the plurality of VSATs, and each respective group of requested data packets includes at most one data packet requested by each VSAT in the plurality of VSATs, such that the first requested data packet and the second requested data packet are requested by different VSATs, wherein generating a first retransmission packet includes:
  - determining the first requested data packet is requested for retransmission by a first VSAT,
  - determining whether a third requested data packet that is requested by the first VSAT has been XOR summed into the first retransmission packet, and
  - if the third requested data packet that was requested by the first VSAT has not been XOR summed into the first retransmission packet, XOR summing the first requested data packet into the retransmission packet and modifying a header of the first retransmission packet to identify the first requested data packet, and
  - if the third requested data packet that was requested by the first VSAT has been XOR summed into the retransmission packet, not XOR summing the first requested data packet into the retransmission packet and maintaining the header of the first retransmission packet to not identify the first requested data packet.

12. The apparatus of claim 11, wherein the requested data packets were not correctly received by at least one of the plurality of VSATs.

13. The apparatus of claim 11, wherein one of the retransmission packets does not comprise the XOR sum of more than one requested data packet from one of the plurality of VSATs.

14. An apparatus for efficient retransmission over a satellite network comprising:
- a very small aperture terminal (VSAT) comprising:
- a processor; and
- a memory storing instructions configured to be executed by the processor to:
- receive data packets from a satellite;
- transmit a retransmission request for at least one data packet to the satellite;
- receive at least one retransmission packet, including an exclusive OR (XOR) sum of a respective group of requested data packets from a plurality of VSATs, the respective group including at least a first requested data packet and a second requested data packet, and each respective group of requested data packets including at most one data packet requested by each VSAT in the plurality of VSATs, such that the first requested data packet and the second requested data packet are requested by different VSATs, wherein a first retransmission packet is generated by:
  - determining the first requested data packet is requested for retransmission by a first VSAT,
  - determining whether a third requested data packet that is requested by the first VSAT has been XOR summed into the first retransmission packet, and
  - if the third requested data packet that was requested by the first VSAT has not been XOR summed into the first retransmission packet, XOR summing the first requested data packet into the retransmission packet and modifying a header of the first retransmission packet to identify the first requested data packet, and
  - if the third requested data packet that was requested by the first VSAT has been XOR summed into the retransmission packet, not XOR summing the first requested data packet into the retransmission packet and maintaining the header of the first retransmission packet to not identify the first requested data packet; and
- recover the requested at least one data packet based on subtraction using XOR of the received data packet from the respective group of requested data packets that includes at most one data packet requested by each VSAT in the plurality of VSATs.

15. The apparatus of claim 14, wherein the requested at least one data packet was not correctly received by the VSAT.

16. The apparatus of claim 14, wherein a second retransmission packet does not comprise an XOR sum of more than one requested data packet from the VSAT.

17. The system of claim 1, wherein the second requested data packet is XOR summed into the first retransmission packet.

18. The system of claim 17, wherein the second requested data packet was requested by a second VSAT.

19. The system of claim 17, wherein a fourth requested data packet that was requested by a second VSAT is XOR summed into the first retransmission packet.

* * * * *